(12) United States Patent
Ramachandra et al.

(10) Patent No.: US 11,587,447 B2
(45) Date of Patent: Feb. 21, 2023

(54) DYNAMICALLY MODIFIABLE PARAMETERS IN REQUIRED TIME OF ARRIVAL (RTA) REGIONS OF AN ASSIGNED FLIGHT PATH

(71) Applicant: HONEYWELL INTERNATIONAL INC., Charlotte, NC (US)

(72) Inventors: Sripathi Ramachandra, Bangalore (IN); Michael Jackson, Maple Grove, MN (US); Ryan Howe-Veenstra, Plymouth, MN (US)

(73) Assignee: HONEYWELL INTERNATIONAL INC., Charlotte, NC (US)

( * ) Notice: Subject to any disclaimer, the term of this patent is extended or adjusted under 35 U.S.C. 154(b) by 222 days.

(21) Appl. No.: 17/098,561

(22) Filed: Nov. 16, 2020

(65) Prior Publication Data
US 2021/0233414 A1 Jul. 29, 2021

(30) Foreign Application Priority Data
Jan. 23, 2020 (IN) .............................. 202011003070

(51) Int. Cl.
*G08G 5/00* (2006.01)
*G01C 23/00* (2006.01)

(52) U.S. Cl.
CPC ......... *G08G 5/0039* (2013.01); *G08G 5/0021* (2013.01); *G08G 5/0047* (2013.01); *G01C 23/00* (2013.01); *G08G 5/0091* (2013.01)

(58) Field of Classification Search
CPC .. G08G 5/0039; G08G 5/0021; G08G 5/0047; G08G 5/0091; G08G 5/0065;
(Continued)

(56) References Cited

U.S. PATENT DOCUMENTS 5,408,413 A 4/1995 Gonser et al.
6,507,782 B1 1/2003 Rumbo et al.
(Continued)

FOREIGN PATENT DOCUMENTS

| CN | 109191919 A | 1/2019 |
|---|---|---|
| EP | 3435357 A1 | 1/2019 |
| EP | 3537108 A1 | 9/2019 |

OTHER PUBLICATIONS

Dancila, R., "Vertical Flight Profile Optimization for a Cruise Segment with RTA Constraints," The Aeronautical Journal, Jul. 2019, vol. 123 No. 1265.

*Primary Examiner* — Shon G Foley
(74) *Attorney, Agent, or Firm* — Lorenz & Kopf, LLP

(57) ABSTRACT

Systems and methods provide dynamically modifiable parameters in required time of arrival (RTA) speed regions of an assigned flight path of an aircraft. The system includes a vertical situation display (VSD) rendering thereon a vertical flight profile of the assigned flight path. A control module is coupled to the display system and configured to: demark the vertical flight profile with a plurality of RTA speed regions related to an initial speed profile; render an RTA speed band graphic having demarked sections vertically representing a speed minimum and speed maximum for an respective RTA speed region, the RTA speed band graphic representing a normalized speed range between zero and a maximum value for each respective RTA speed region. The control module accepts user modifications and updates the RTA speed band graphic and the current speed profile to reflect user input.

19 Claims, 6 Drawing Sheets

(58) Field of Classification Search
CPC .... G08G 5/025; G08G 5/0078; G08G 5/0052; G01C 23/00
See application file for complete search history.

(56) References Cited

U.S. PATENT DOCUMENTS

| | | |
|---|---|---|
| 7,765,061 B1 | 7/2010 | Barber et al. |
| 8,321,071 B2 | 11/2012 | Klooster |
| 8,788,189 B2 | 7/2014 | Polansky et al. |
| 8,812,180 B2 | 8/2014 | Wachenheim et al. |
| 9,540,005 B1 * | 1/2017 | Howe-Veenstra ..... G01C 21/20 |
| 9,947,231 B2 | 4/2018 | Garrido Lopez |
| 10,013,236 B2 | 7/2018 | Bailey et al. |
| 10,049,585 B2 | 8/2018 | Lopez |
| 10,144,505 B2 | 12/2018 | Kim |
| 10,584,979 B1 * | 3/2020 | Gunn ................... G08G 5/0021 |
| 2011/0118908 A1 | 5/2011 | Boorman et al. |
| 2016/0103579 A1 | 4/2016 | Coulmeau et al. |
| 2017/0032576 A1 | 2/2017 | Mazoyer et al. |
| 2017/0249849 A1 | 8/2017 | De Prins et al. |

\* cited by examiner

DYNAMICALLY MODIFIABLE PARAMETERS IN REQUIRED TIME OF ARRIVAL (RTA) REGIONS OF AN ASSIGNED FLIGHT PATH

CROSS REFERENCE TO RELATED APPLICATION

This application claims priority to Indian Provisional Patent Application No. 202011003070, filed Jan. 23, 2020, the entire content of which is incorporated by reference herein.

TECHNICAL FIELD

The technical field generally relates to flight guidance systems and methods, and more particularly relates to providing dynamically modifiable parameters in required time of arrival (RTA) regions of an assigned flight path.

BACKGROUND

One of many considerations during an aircraft flight is a required time of arrival (RTA), which may be set prior to flight. During the flight, various scenarios can unfavorably affect the likelihood of completing a trip and arriving at a destination at the RTA. Various strategies may be used to attempt to meet the RTA.

One way to affect the RTA is to modify aircraft speed. The flight path of an aircraft may be described as a flight profile having a sequence of predefined stages or phases. When there is an RTA, each flight phase may be subdivided into regions, and each region may have a speed that is computed and/or adjusted based on the RTA. At any given time, some of these regions may individually accommodate an adjustment of speed based on the RTA, and some of the regions may not. As used herein, the regions that are speed-adjustable based on the RTA are referred to as RTA speed regions. RTA speed region(s) are a category of parameters that play a critical role in computing RTA speeds for an aircraft flight to meet an RTA. Once RTA speeds are determined for the regions making up a flight path, operating/flying in alignment with the RTA speeds is critical for meeting the RTA.

In many available flight guidance systems, RTA speed regions are predefined and have fixed predefined RTA speed parameters, such as an assigned start and end, assigned priority with respect to each other, and etc. The predefined RTA speed parameters are generally set by a manufacturer and/or airline, and not dynamically editable in real time by a pilot. A technical problem is presented in that pilots may wish to interact with the RTA speed parameters, for example, to know where the RTA speed regions are, which ones they can speed adjust, to what extent they can speed adjust them (e.g., max/min limits), and how an adjustment in one speed region may affect other flight phases and RTA speed regions.

Accordingly, improved systems and methods that enable a pilot to interact in real time with RTA speed region parameters are desirable. Desirable systems provide dynamically modifiable parameters in required time of arrival (RTA) regions of an assigned flight path. The following disclosure provides these and other technological enhancements, in addition to addressing related issues.

BRIEF SUMMARY

This summary is provided to describe select concepts in a simplified form that are further described in the Detailed Description. This summary is not intended to identify key or essential features of the claimed subject matter, nor is it intended to be used as an aid in determining the scope of the claimed subject matter.

In an embodiment, a processor-implemented method providing dynamically modifiable parameters in required time of arrival (RTA) speed regions of an assigned flight path is provided. The method includes: rendering a vertical flight profile of the assigned flight path on a vertical situation display (VSD); demarking the vertical flight profile with a plurality of RTA speed regions associated with a speed profile based on a received RTA; rendering, on the VSD, an RTA speed band graphic that extends horizontally from a start of climb speed to a start of approach speed, the RTA speed band graphic having demarked sections that vertically represent a speed minimum and speed maximum associated with a current speed profile, the speed minimum and speed maximum referred to as a speed range, and a vertical spread for the RTA speed band graphic representing a normalized speed range between zero and a maximum value for each respective RTA speed region; prompting a user for user input to edit an RTA speed region of the plurality of RTA speed regions; and in response to receiving the user input, modifying the RTA speed band graphic and the current speed profile to reflect the user input.

Also provided is a system providing dynamically modifiable parameters in required time of arrival (RTA) speed regions of an assigned flight path. The system includes: a vertical situation display (VSD) rendering thereon rendering a vertical flight profile of the assigned flight path; and a processor programmed to: demark the vertical flight profile with a plurality of RTA speed regions associated with a speed profile based on a received RTA; render, on the VSD, an RTA speed band graphic that extends horizontally from a start of climb speeds to a start of approach speeds, the RTA speed band graphic having demarked sections that vertically represent a speed minimum and speed maximum associated with a current speed profile, the speed minimum and speed maximum referred to as a speed range, and a vertical spread for the RTA speed band graphic representing a normalized speed range between zero and a maximum value for each respective RTA speed region; prompt a user for user input to edit an RTA speed region of the plurality of RTA speed regions, the user input being for each of (i) edit a priority order for the RTA speed region, and (ii) select an RTA speed region for a speed range modification; receive user input for an RTA speed region; and modify the RTA speed band graphic and the current speed profile to reflect the user input.

A flight guidance system providing dynamically modifiable parameters in required time of arrival (RTA) speed regions of an assigned flight path of an aircraft is provided. The system includes: a display system with a vertical situation display (VSD) rendering thereon a vertical flight profile of the assigned flight path; and a control module coupled to the display system and configured to: demark the vertical flight profile with a plurality of RTA speed regions related to an initial speed profile that is a function of an RTA; render, on the display system, an RTA speed band graphic having demarked sections vertically aligned with the plurality of RTA speed regions, each demarked section vertically representing a speed minimum and speed maximum for an respective RTA speed region, the speed minimum and speed maximum referred to as a speed range, and a vertical spread for the RTA speed band graphic representing a normalized speed range between zero and a maximum value for each respective RTA speed region; receive user input for an RTA speed region; and modify the RTA speed band graphic and the current speed profile to reflect the user input.

Furthermore, other desirable features and characteristics of the system and method will become apparent from the subsequent detailed description and the appended claims, taken in conjunction with the accompanying drawings and the preceding background.

BRIEF DESCRIPTION OF THE DRAWINGS

The present application will hereinafter be described in conjunction with the following drawing figures, wherein like numerals denote like elements, and.

DETAILED DESCRIPTION

Figure 1:
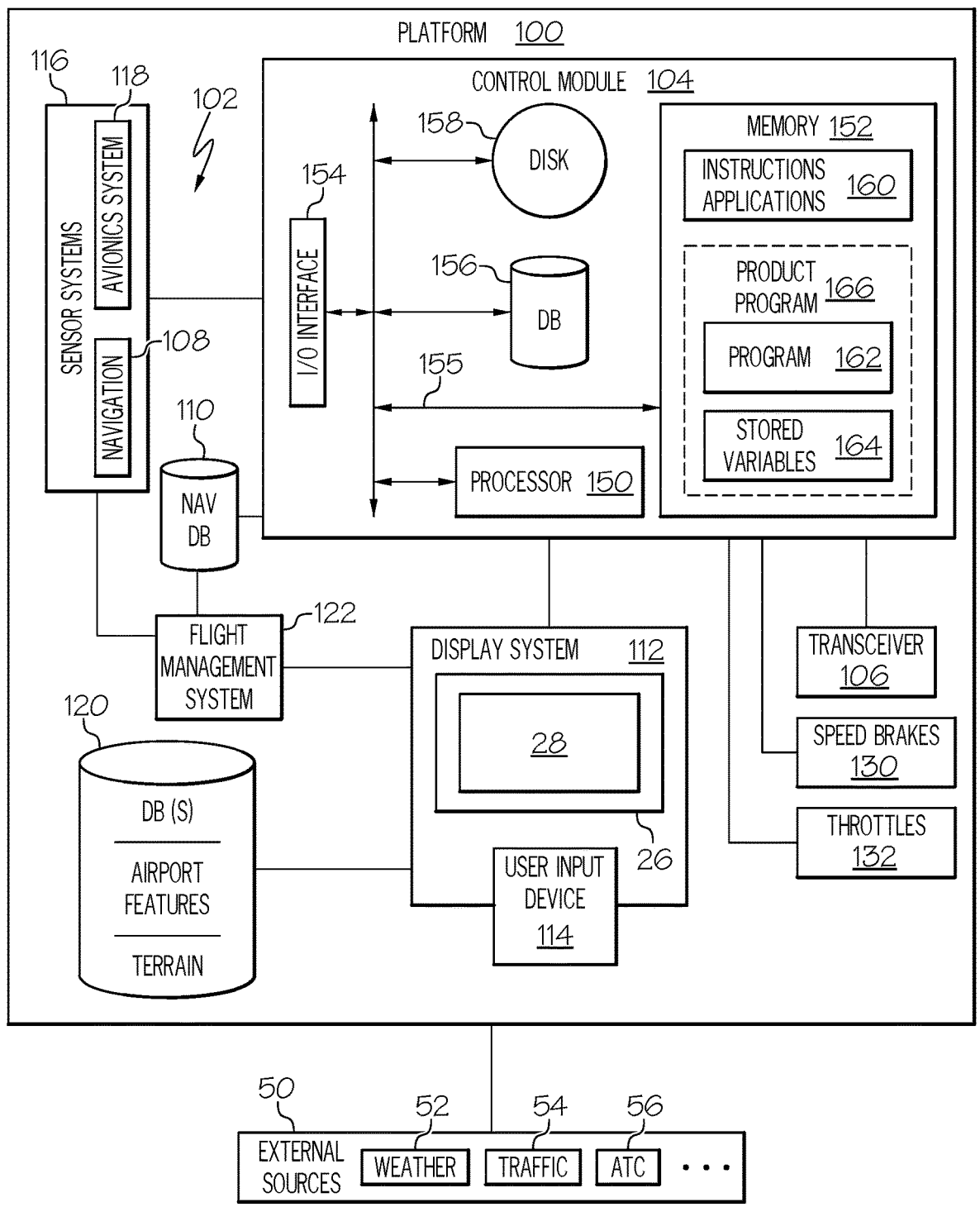
FIG. 1 is a block diagram of a system for dynamically modifiable speed limits in required time of arrival (RTA) regions of an assigned flight path, in accordance with an exemplary embodiment.

The following detailed description is merely illustrative in nature and is not intended to limit the embodiments of the subject matter or the application and uses of such embodiments. As used herein, the word "exemplary" means "serving as an example, instance, or illustration." Thus, any embodiment described herein as "exemplary" is not necessarily to be construed as preferred or advantageous over other embodiments. The embodiments described herein are exemplary embodiments provided to enable persons skilled in the art to make or use the invention and not to limit the scope of the invention that is defined by the claims. Furthermore, there is no intention to be bound by any expressed or implied theory presented in the preceding technical field, background, summary, or the following detailed description.

As mentioned, in many available flight guidance systems, RTA speed regions are predetermined and described with assigned, fixed, parameters. The fixed RTA parameters may include, for each RTA speed region: having a predetermined start and end; and, an assigned speed for travel therebetween that is calculated based on the RTA. The start and end points may be referred to as flight transition points and are sometimes waypoints. The RTA may be for the final destination, or may be for an intermediate location, such as a waypoint. Another RTA parameter can be a predetermined and fixed priority with respect to remaining RTA speed regions. The predetermined priority dictates a sequential manner for adjusting speeds in each RTA speed region to accommodate an RTA (i.e., always a same sequence, like dominoes). In available flight guidance systems, the RTA speed regions and their parameters are not dynamically editable by a pilot. A technical problem is presented in that pilots may wish to modify RTA speed region parameters in real time, including, to know where on a flight profile the RTA speed regions are, which ones they can adjust, to what extent they can adjust them (e.g., max/min limits), and how an adjustment in one RTA speed region may affect other RTA speed regions and flight phases in the flight profile.

Additional technical problems are presented when a pilot wishes to change an order of priority of one or more RTA speed regions with respect to the others or avoid/override a speed adjustment in a specific RTA speed region due to uncomfortable traffic, weather disturbances, or the like.

Embodiments disclosed herein provide a technical solution to these technical problems. Exemplary embodiments of systems and methods provide pilot flexibility with at least the following RTA parameters: prioritization of RTA speed regions, modification of maximum and minimum limits in the RTA regions, and individually enabling/disabling a specific RTA speed region. Exemplary embodiments also enhance the human-machine interface in that they display a graphic along or near the vertical flight profile on a cockpit display using symbolism and cues that make the editable parameters, and their interactions with each other, intuitive and easy to utilize.

Turning now to FIG. 1, in an embodiment, the system for dynamically modifiable parameters in required time of arrival (RTA) speed regions of an assigned flight path 102 (also referred to herein as "system" 102) is generally located in a mobile platform 100. In various embodiments, the mobile platform 100 is an aircraft, and is referred to as aircraft 100. The system 102 embodies a control module 104 (which is depicted in a functional form as an enhanced computer system). Although the control module 104 is shown as an independent functional block, the control module 104 may be integrated within a preexisting mobile platform management system, avionics system, cockpit display system (CDS), flight controls system (FCS), or aircraft flight management system (FMS 122). Although the control module 104 is shown onboard the aircraft 100, optionally, it may exist in a flight guidance system or an optional electronic flight bag (EFB). In embodiments in which the control module 104 is within an EFB, the display system 112 and user input device 114 may also be part of the EFB. Further, in some embodiments, the control module 104 may reside in a portable electronic device (PED) such as a tablet, cellular phone, or the like.

The control module 104 performs the processing functions of the system 102. To perform these functions, the control module 104 may be operatively coupled to any combination of the following aircraft systems: a source of real-time aircraft status data, such as a navigation system 108; a source of prescribed flight plan data, such as a navigation database (NavDB 110); and, a display system 112. In various embodiments, the control module 104 is additionally operationally coupled to one or more of: a transceiver 106; a user input device 114; one or more databases 120; a flight management system (FMS 122); a speed brakes 130 system; a throttle 132 system; and one or more avionics systems sensors 118. The functions of these aircraft systems, and their interaction, are described in more detail below.

The navigation system 108 is a type of sensor system 116. The navigation system 108 is configured to provide real-time navigation data and/or information regarding operation of the aircraft 100. As used herein, "real-time" is interchangeable with current and instantaneous. The navigation system 108 may be realized as including a global positioning system (GPS), inertial reference system (IRS), or a radio-based navigation system (e.g., VHF omni-directional radio range (VOR) or long-range aid to navigation (LORAN)), and may include one or more navigational radios or other sensors suitably configured to support operation of the FMS 122, as will be appreciated in the art. The data provided by the navigation system 108 is referred to as navigation data (also referred to herein as aircraft status data). Aircraft status data may include any of: an instantaneous position (e.g., the latitude, longitude, orientation), a flight path angle, a vertical speed, a ground speed, an instantaneous altitude (or height above ground level), an instantaneous heading of the aircraft 100 (i.e., the direction the aircraft is traveling in relative to some reference), and a current phase of flight. The real-time aircraft status data, or navigation data, is made available such that the display system 112, the transceiver 106, and the control module 104, may further process and/or handle the aircraft status data.

Prescribed flight plan data may include a series of intended geospatial midpoints between a departure and an arrival, as well as performance data associated with each of the geospatial midpoints (the performance data including intended navigation data such as intended airspeed, intended altitude, intended acceleration, intended flight path angle, and the like). A source of a prescribed flight plan data may be a storage location or a user input device. In various embodiments, the NavDB 110 is the source of a prescribed flight plan. The navigation database (NavDB 110) is a storage location that may also maintain a database of flight plans, and/or information regarding terrain and airports and/or other potential landing locations (or destinations) for the aircraft 100. In operation, the navigation system 108 and the NavDB 110 may be integrated with an FMS 122.

The avionics system(s) 118 is another type of sensor system 116. In various embodiments, the avionics system(s) 118 provide aircraft performance data and feedback for subsystems on the aircraft 100. Examples of the aircraft performance data include: engine thrust level, fuel level, braking status, temperature control system status, and the like. As may be appreciated, the avionics system(s) 118 may therefore include a variety of on-board detection sensors, and, as part of the sensor systems 116, may be operationally coupled to the FMS 122.

In various embodiments, the FMS 122, in cooperation with the sensor systems 116 and the NavDB 110, provides real-time flight guidance for aircraft 100. The FMS 122 is configured to compare the instantaneous position and heading of the aircraft 100 with a prescribed flight plan for the aircraft 100. To this end, in various embodiments, the NavDB 110 supports the FMS 122 in maintaining an association between a respective airport, its geographic location, runways (and their respective orientations and/or directions), instrument procedures (e.g., approach procedures, arrival routes and procedures, takeoff procedures, and the like), airspace restrictions, and/or other information or attributes associated with the respective airport (e.g., widths and/or weight limits of taxi paths, the type of surface of the runways or taxi path, and the like). In various embodiments, the FMS 122 also supports controller pilot data link communications (CPDLC), such as through an aircraft communication addressing and reporting system (ACARS) router; this feature may be referred to as a communications management unit (CMU) or communications management function (CMF). Accordingly, in various embodiments, the FMS 122 may be a source for the real-time aircraft status data of the aircraft 100.

The display system 112 may be referred to as an avionics display system, and includes a display device 26 for presenting an image 28. The display system 112 is configured to continuously receive and process real-time aircraft status data and flight plan information. In various embodiments, the display system 112 formats and renders information received from the FMS 122, as well as external sources 50. In various embodiments, the display system 112 may directly receive input from an air data heading reference system (AHRS), an inertial reference system (IRS), the navigation system 108, or the FMS 122. The control module 104 and the display system 112 are cooperatively configured to generate the commands ("display commands") for the display device 26 to render thereon the image 28, comprising various graphical user interface elements, tables, menus, buttons, and pictorial images, as described herein. In exemplary embodiments, the display device 26 is realized on one or more electronic display devices configured as any combination of: a head up display (HUD), an alphanumeric display, a vertical situation display (VSD) and a lateral navigation display (ND). The display device 26 is responsive to display commands from the control module 104 and/or display system 112.

Renderings on the display system 112 may be processed by a graphics system, components of which may be integrated into the display system 112 and/or be integrated within the control module 104. Display methods include various types of computer-generated symbols, text, and graphic information representing, for example, pitch, heading, flight path, airspeed, altitude, runway information, waypoints, targets, obstacles, terrain, and required navigation performance (RNP) data in an integrated, multi-color or monochrome form. Display methods also include various formatting techniques for visually distinguishing objects and routes from among other similar objects and routes, and for causing objects and symbols to fade-in and fade-out. As used herein, a fade-in and/or fade-out means changing between not being rendered at all (i.e., zero percent) and being fully rendered (i.e., 100%) in incremental steps. The control module 104 is said to display various images and selectable options described herein. In practice, this may mean that the control module 104 generates display commands, and, responsive to receiving the display commands from the control module 104, the display system 112 displays, renders, or otherwise visually conveys on the display device 26, the graphical images associated with operation of the aircraft 100, and specifically, the graphical images as described herein.

The user input device 114 and the control module 104 are cooperatively configured to allow a user (e.g., a pilot, co-pilot, or crew member) to interact with display devices in the display system 112 and/or other elements of the system 102, as described in greater detail below. Depending on the embodiment, the user input device 114 may be realized as a cursor control device (CCD), keypad, touchpad, keyboard, mouse, touch panel (or touchscreen), joystick, knob, line select key, voice controller, gesture controller, or another suitable device adapted to receive input from a user. When the user input device 114 is configured as a touchpad or touchscreen, it may be integrated with the display system 112. As used herein, the user input device 114 may be used to for a pilot to accept a runway change or to request a runway change.

In various embodiments, any combination of the FMS 122, user input device 114, and transceiver 106, may be coupled to the display system 112 such that the display system 112 may additionally generate or render, on a display device 26, real-time information associated with respective aircraft 100 components. Coupled in this manner, the FMS 122 and transceiver 106 are configured to provide navigation information to support navigation, flight planning, and other aircraft control functions in a conventional manner, as well as to provide real-time data and/or information regarding the operational status of the aircraft 100 to the control module 104. In some embodiments, the user input device 114, FMS 122, and display system 112 are configured as a control display unit (CDU).

External sources 50 communicate with the aircraft 100, generally by way of transceiver 106. External sources include: weather and surface data sources (weather 52), such as a source for meteorological terminal aviation weather reports (METARS), automatic terminal information service (ATIS), datalink ATIS (D-ATIS), automatic surface observing system (ASOS); traffic data system(s) 54; air traffic control (ATC) 56; and a variety of other radio inputs. The traffic data system(s) 120 include numerous systems for providing real-time neighbor/relevant traffic data and information. For example, traffic data sources 54 may include any combination of: traffic collision avoidance system (TCAS), automatic dependent surveillance broadcast (ADS-B), traffic information system (TIS), crowd sourced traffic data and/or another suitable avionics system. Flight traffic information that is received from the traffic data system may include, for each neighbor aircraft of a plurality of neighbor aircraft, one or more of a respective (i) instantaneous position and location, vertical speed, and ground speed, (ii) instantaneous altitude, (iii) instantaneous heading of the aircraft, and (iv) aircraft identification. Information received from external sources may be processed as one or more information layers (for example, a weather layer, a traffic layer, and the like) and layers may be selectively overlaid on an existing image 28.

The transceiver 106 is configured to support instantaneous (i.e., real time or current) communications between the aircraft 100 and the one or more external data source(s) 50. As a functional block, the transceiver 106 represents one or more transmitters, receivers, and the supporting communications hardware and software required for the system 102 to communicate with the various external data source(s) 50 as described herein. In an example, the transceiver 106 supports bidirectional pilot-to-ATC (air traffic control) communications via a datalink. In addition to supporting the data link system, the transceiver 106 is configured to include or support an automatic dependent surveillance broadcast system (ADS-B), a communication management function (CMF) uplink, a terminal wireless local area network (LAN) unit (TWLU), or any other suitable radio communication system that supports communications between the aircraft 100 and the various external source(s) 50. In this regard, the transceiver 106 may allow the aircraft 100 to receive information that would otherwise be unavailable to the pilot and/or co-pilot using only the onboard systems.

In various embodiments, the control module 104 is additionally operationally coupled to one or more databases 120. The databases 120 may include an airport features database, having therein maps and geometries, as well as airport status data for the runways and/or taxi paths at the airport; the airport status data indicating operational status and directional information for the taxi paths (or portions thereof). Additionally, the databases 120 may include a terrain database, having therein topographical information for the airport and surrounding environment.

As mentioned, the control module 104 performs the functions of the system 102. As used herein, the term "module" refers to any means for facilitating communications and/or interaction between the elements of the system 102 and performing additional processes, tasks and/or functions to support operation of the system 102, as described herein. In various embodiments, the control module 104 may be any hardware, software, firmware, electronic control component, processing logic, and/or processor device, individually or in any combination. In various embodiments, the control module 104 may be implemented or realized as an enhanced computer system with: a general purpose processor (shared, dedicated, or group) controller, microprocessor, or microcontroller, and memory that executes one or more software or firmware programs embodying the algorithms and tasks described herein; a content addressable memory; a digital signal processor; an application specific integrated circuit (ASIC), a field programmable gate array (FPGA); any suitable programmable logic device; combinational logic circuit including discrete gates or transistor logic; discrete hardware components and memory devices; and/or any combination thereof, designed to perform the functions described herein.

Accordingly, in FIG. 1, an embodiment of the control module 104 is depicted as an enhanced computer system including a processor 150 and a memory 152. The processor 150 may comprise any type of processor or multiple processors, single integrated circuits such as a microprocessor, or any suitable number of integrated circuit devices and/or circuit boards working in cooperation to carry out the described operations, tasks, and functions by manipulating electrical signals representing data bits at memory locations in the system memory, as well as other processing of signals. The memory 152 may comprise RAM memory, ROM memory, flash memory, registers, a hard disk, or another suitable non-transitory short or long-term storage media capable of storing computer-executable programming instructions or other data for execution. The memory 152 may be located on and/or co-located on the same computer chip as the processor 150. Generally, the memory 152 maintains data bits and may be utilized by the processor 150 as storage and/or a scratch pad during operation. Specifically, the memory 152 stores instructions and applications 160. Information in the memory 152 may be organized and/or imported from an external data source 50 during an initialization step of a process; it may also be programmed via a user input device 114.

The novel program 162 includes rules and instructions which, when executed by the processor 150, cause the control module 104 to perform the functions, techniques, and processing tasks associated with the operation of the system 102. Novel program 162 and associated stored variables 164 may be stored in a functional form on computer readable media, as depicted, in memory 152. While the depicted exemplary embodiment is described in the context of a fully functioning computer system, those skilled in the art will recognize that the mechanisms of the present disclosure are capable of being distributed as a program product 166, with one or more types of non-transitory computer-readable signal bearing media used to store the program and the instructions thereof and carry out the distribution thereof, such as a non-transitory computer readable medium bearing the program 162 and containing computer instructions stored therein for causing a computer processor (such as the processor 150) to perform and execute the program 162. Such a program product 166 may take a variety of forms, and the present disclosure applies equally regardless of the type of computer-readable signal bearing media used to carry out the distribution. Examples of signal bearing media include: recordable media such as floppy disks, hard drives, memory cards and optical disks, and transmission media such as digital and analog communication links. It will be appreciated that cloud-based storage and/or other techniques may also be utilized in certain embodiments.

During operation, the processor 150 loads and executes one or more programs, algorithms and rules embodied as instructions and applications 160 contained within the memory 152 and, as such, performs the tasks and operations attributed herein to the general operation of the system 102. In specifically executing the processes described herein, the processor 150 loads the instructions, algorithms, and rules embodied in the program 162, thereby being programmed with program 162. During execution of program 162, the processor 150 and the memory 152 form the control module 104 that performs the processing activities of the system 102.

In various embodiments, the processor/memory unit of the control module 104 may be communicatively coupled (via a bus 155) to an input/output (I/O) interface 154, and a database 156. The bus 155 serves to transmit programs, data, status and other information or signals between the various components of the control module 104. The bus 155 can be any suitable physical or logical means of connecting computer systems and components. This includes, but is not limited to, direct hard-wired connections, fiber optics, infrared and wireless bus technologies.

The I/O interface 154 enables intra control module 104 communication, as well as communications between the control module 104 and other system 102 components, and between the control module 104 and the external data sources via the transceiver 106. The I/O interface 154 may include one or more network interfaces and can be implemented using any suitable method and apparatus. In various embodiments, the I/O interface 154 is configured to support communication from an external system driver and/or another computer system. Also, in various embodiments, the I/O interface 154 may support communication with technicians, and/or one or more storage interfaces for direct connection to storage apparatuses, such as the database 156. In one embodiment, the I/O interface 154 is integrated with the transceiver 106 and obtains data from external data source(s) directly.

The database 156 may include an aircraft-specific parameters database (comprising aircraft-specific parameters and configuration data for aircraft 100, as well as for a variety of other aircrafts) and parameters and instructions for processing user inputs and rendering images 28 on the display device 26, as described herein. In some embodiments, the database 156 is part of the memory 152. In various embodiments, the database 156 and the database 120 are integrated, either within the control module 104 or external to it. Accordingly, in some embodiments, the airport features and terrain features are pre-loaded and internal to the control module 104. Another form of storage media that may be included in, and utilized by, the control module 104 is an optional hard disk 158.

As mentioned, the technologically improved systems and methods provided herein provide critical information to pilots for visualizing RTA speed regions, and for dynamically modifying the RTA speed region parameters. FIGS. 2-5 provide examples of displayed information.

Figure 2:
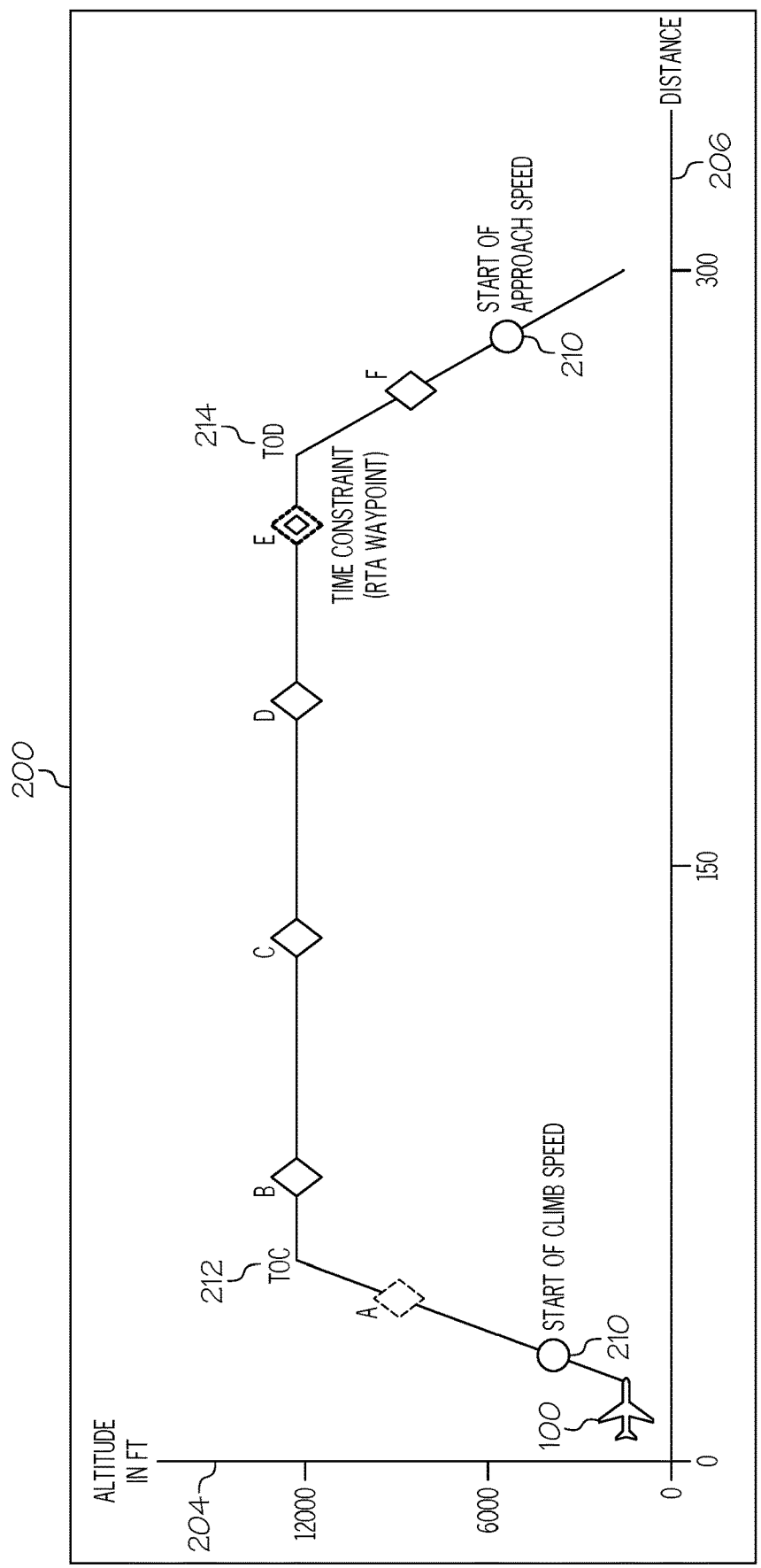
FIG. 2 is an illustration of a flight profile with potential RTA speed regions, in accordance with an exemplary embodiment.

In FIG. 2, a vertical flight profile 202 is displayed on a vertical situation display 200, such as may be found on an avionics or cockpit display. Altitude is noted on the Y axis and distance in nautical miles is noted on the X axis. A first cue demarks a start of climb speed 208, and a second cue demarks a start of approach speed region 210. Top of climb (TOC) 212 and top of descent (TOD) 214 are demarked (a Cruise phase of flight generally extends from TOC 212 to TOD 214), and waypoints A through F are demarked. In various scenarios, a distance between waypoint E and TOD 214 can vary. RTA speeds can begin to apply at the start of climb speed 208 or at waypoint A (during the climb), or at TOC 212. In an example, if waypoint E were to have an RTA, then the speeds in the segments prior to E may be adjusted to achieve the RTA at waypoint E.

Figure 3:
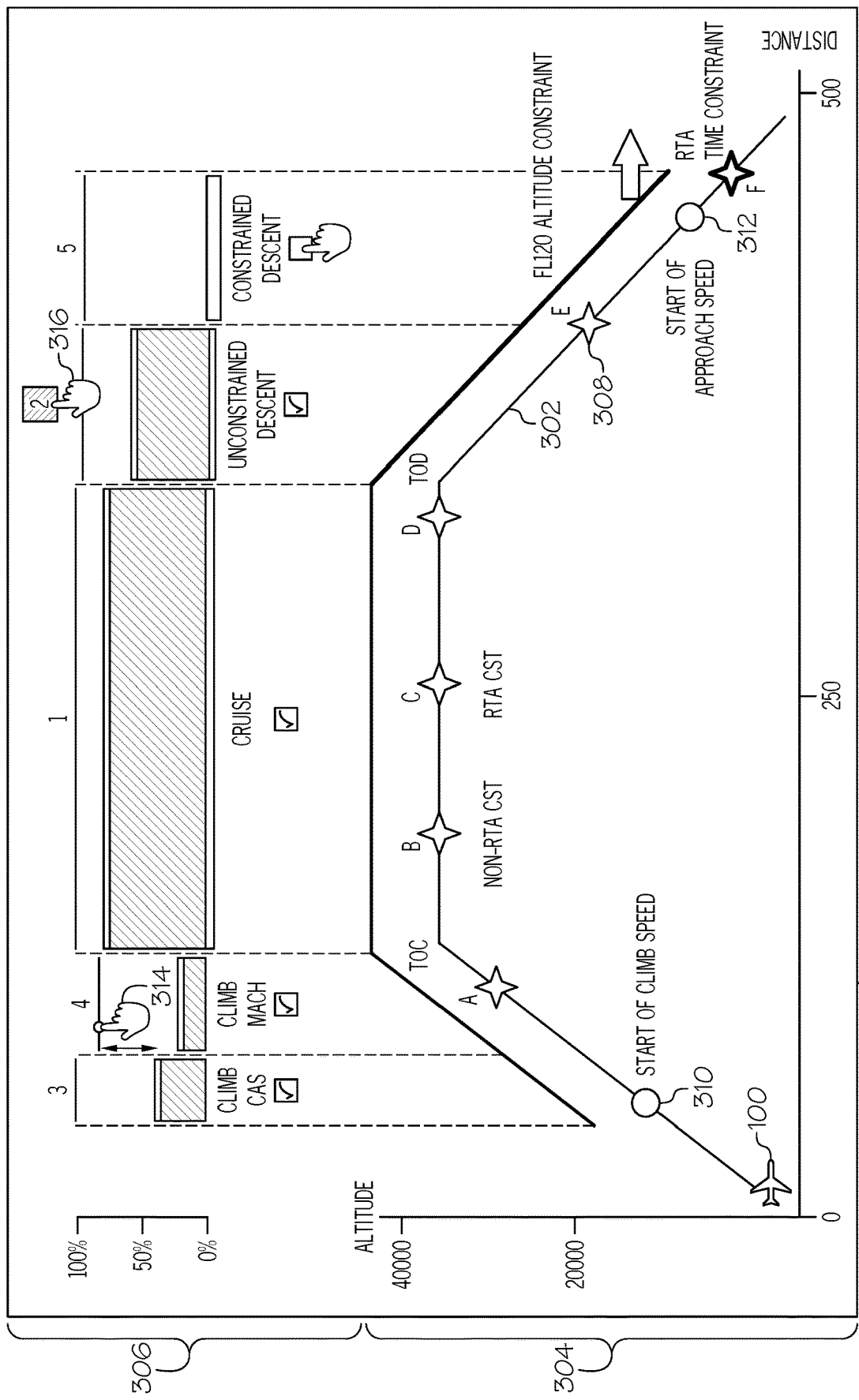
FIGS. 3-5 are illustrations of graphics that can be generated by a system or method for dynamically modifiable speed limits in required time of arrival (RTA) regions of an assigned flight path, in accordance with an exemplary embodiment.
Figure 4:
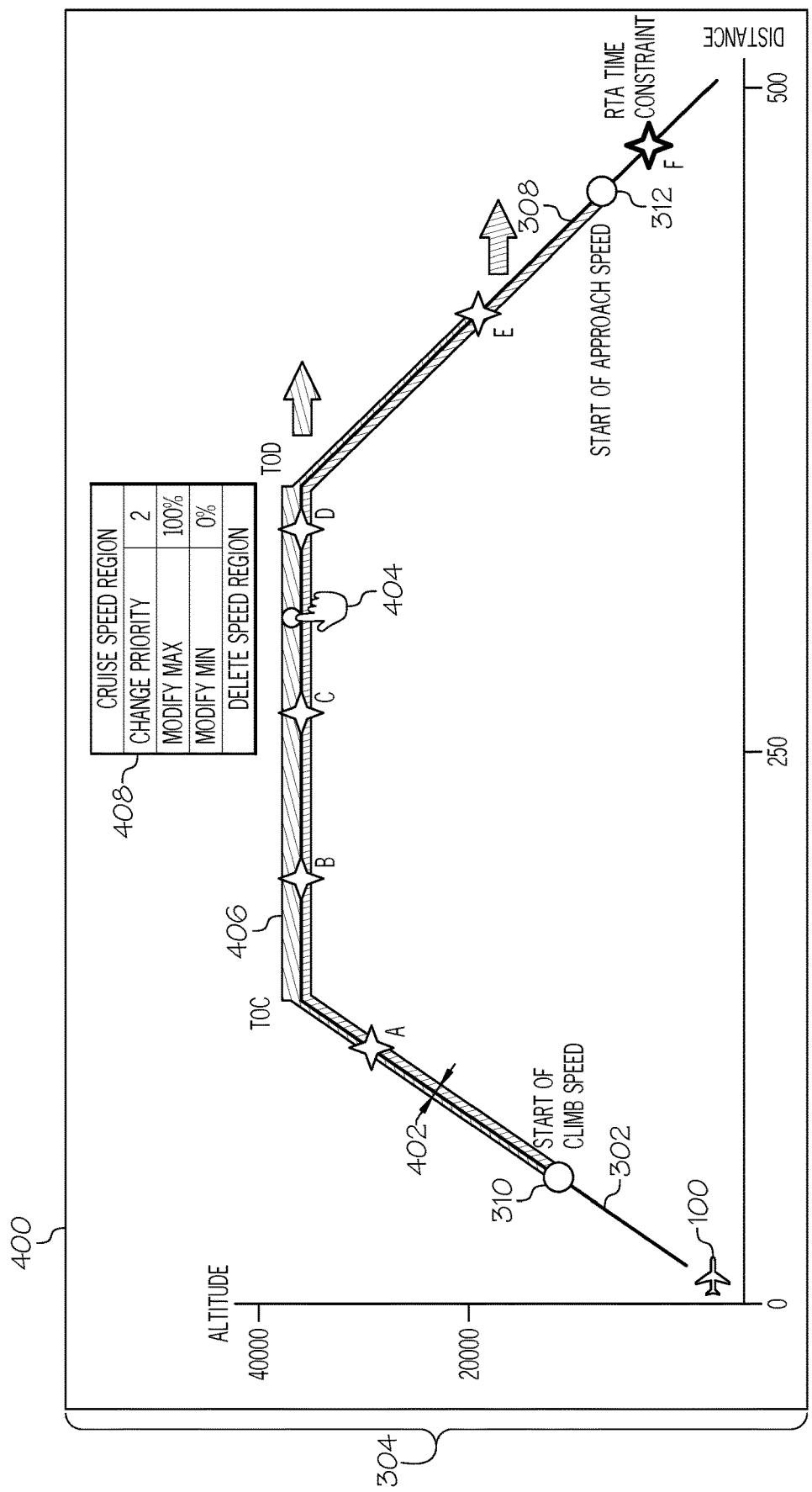
Figure 5:
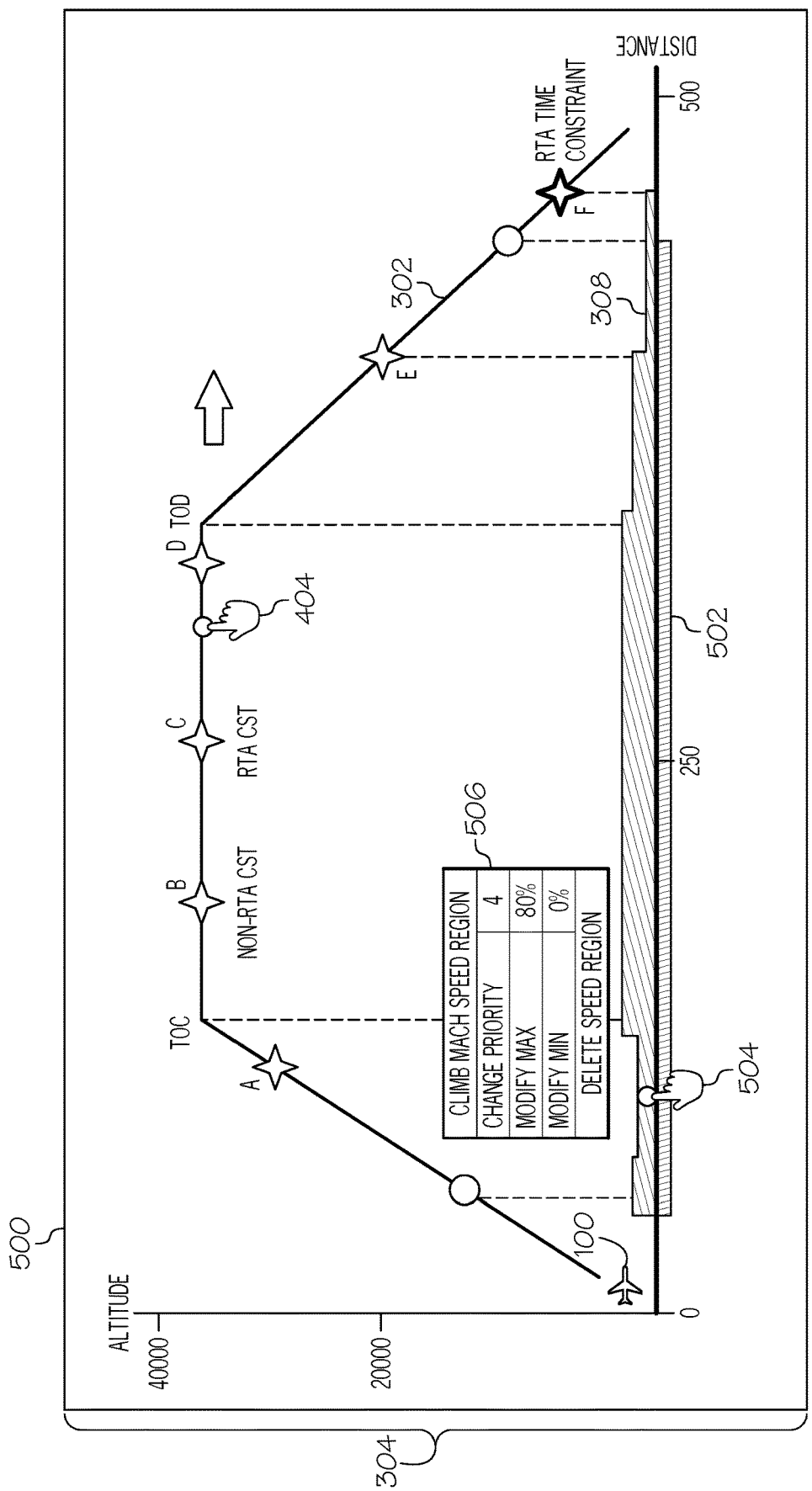

FIGS. 3-5 provide exemplary embodiments of an intuitive graphic that can be generated by a system or method for dynamically modifiable speed limits in required time of arrival (RTA) regions. In FIGS. 3-5, a vertical flight profile 302 for a flight from takeoff to landing is shown in a VSD 304 area of an image 28 (image 28 corresponds to avionics display FIG. 3, 300; FIG. 4 400; and FIG. 5 500). An extent 308 of the vertical flight profile 302 that is in play for RTA speed adjustments in the course of the flight is demarked with a plurality of abutted RTA speed regions; the RTA speed regions and their parameters correspond to a speed profile based on a received RTA. Additionally, a flight phase, such as Cruise, can be segmented, each segment having a different planned cruise speed target (cst). In a non-limiting example, there may be a non-RTA cst and an RTA cst. In another non-limiting example, some segments may have a Max speed target, some segments may have an endurance speed target, and some segments may have an RTA speed target.

Waypoints and features A-F are denoted on the vertical flight profile 302 with a respective cue. Cue B denotes "non-RTA cst," cue C denotes "RTA cst," cue E denotes a flight level 120 altitude constraint, and cue F denotes the RTA time constraint. The extent 308 of the RTA speed region of the vertical flight profile 302 begins at the start of climb speeds 310 and ends at the start of approach speeds 312. The system 102 generates, renders, and updates a dynamically modifiable RTA speed band graphic that corresponds to the RTA speed regions and/or segments, and can be depicted in several ways, as described below.

In FIG. 3, avionics display 300 depicts the RTA speed band graphic 306 aligned above, but separate from, the vertical flight profile 302. RTA speed band graphic 306 extends horizontally from the start of climb speeds 310 to the start of approach speeds 312, the horizontal extent of the RTA speed band graphic 306 has demarked sections that align vertically with the RTA speed regions of the vertical flight profile 302. The exemplary RTA speed band graphic 306 comprises 5 horizontally abutted sections. For each of the horizontally abutted sections, its start point is an altitude and location describing the left-most extent of it, and its end point is an altitude and location describing the right most extent of it.

The RTA speed band graphic 306 has a constant height, or vertical spread through its horizontal extent. Each of the RTA speed regions has a speed minimum and a speed maximum. For a given RTA speed region, the speed minimum and speed maximum may together be referred to as a speed range for the RTA speed region. The system 102 uses the vertical extent to visually communicate the speed minimum and maximum for each section; i.e., the vertical spread for an RTA speed region represents a normalized speed range between zero and a maximum value for the respective RTA speed region. Accordingly, each of the RTA speed regions is rendered such that it vertically represents its own speed minimum and speed maximum associated with the current speed profile (based on the RTA).

System 102 organizes each of the RTA speed regions in accordance with its own unique parameters, and continuously modifies and updates the displayed RTA speed band graphic 306 to reflect changes in the parameters as a function of user input and other input variables. For discussion, Table 1, below, provides an example of how the system 102 may organize the RTA speed region parameters. An initial speed profile generated for the vertical flight profile 302 may be populated by the FMS 122 and represented by the system 102 as the RTA speed band graphic, and the system 102 may take over for modifications and updates thereafter. Initial values for speed limits may be air traffic control (ATC) or an electronic flight bag (EFB). The priority tells the system 102 where (i.e., which RTA speed region) to absorb the speed changes, if possible.

TABLE 1

RTA speed region parameters

| | Cruise Speed Region | Climb CAS | Climb Mach | Cruise | Unconstrained descent | Constrained descent |
|---|---|---|---|---|---|---|
| Priority | | 3 | 4 | 1 | 2 | 5 |
| Maximum speed | | 40 | 80 | 100 | 60 | 20 |
| Minimum speed | | 0 | 0 | 0 | 0 | 0 |
| Delete speed region? | | N | N | N | N | Y |

The system 102 may prompt a user to enter inputs to edit or modify the speed profile represented in the RTA speed band graphic 306. In some embodiments, the prompt may be an active prompt, such as by displaying an icon or text that asks for input. In other embodiments, the prompt may be passive, in that, once the RTA speed band graphic 306 is displayed, no visual prompt occurs, instead the system 102 is configured to accept user inputs at any time during operation. The system 102 accepts user inputs to modify the speed profile represented by the RTA speed band graphic 306. In an embodiment, the user input being for each of (i) edit a priority order for the RTA speed region, and (ii) select an RTA speed region for a speed range modification. In another embodiment, including any combination of (i) to edit a priority order for the RTA speed region, (ii) to edit a beginning and an ending of an RTA speed region, (iii) to select an RTA speed region for a speed range modification, and specify the speed range modification to the selected RTA speed region. In an embodiment, the user input includes a pilot defined start point and end point for the RTA speed region. In another embodiment, the user input includes disabling RTA speed control for the RTA speed region.

Non-limiting examples of potential user inputs are shown in FIG. 3 with hand symbols. The hand symbol 314 is placed on the Climb Mach RTA speed region, and an up/down arrow alongside the hand symbol 314 shows the user editing minimum and maximum limits (i.e., the speed range) for that RTA speed region. The hand symbol 316 is placed on the unconstrained descent RTA speed region, and the priority number 2 is shown outlined to indicate that the user is changing the priority of that RTA speed region. The hand symbol 318 is placed on the constrained descent RTA speed region, and a box is unchecked below it to indicate that the user is disabling or deleting the RTA speed region. As mentioned, the system 102 modifies at least the displayed RTA speed band graphic 306 responsive to the user input. Modifications include dynamically regenerating RTA speed region parameters. In some embodiments, modification may include recalculating RTA speeds for each of the RTA speed regions. In some embodiments, modification includes reorganizing the priorities of the RTA speed regions.

In an example using FIG. 3, if only the Cruise portion is set as an RTA speed region (as could happen if other RTA speed regions are deleted or disabled), only speeds during the Cruise portion of the vertical flight profile 302 will be modified based on the RTA, and no other portions of the vertical flight profile 302 will be allowed to be modified to meet the RTA.

In FIG. 4, a dynamic RTA speed region graphic 402 is depicted as a thickened portion of the flight profile 302 extending on both the upper and lower side of the VSD 304. In another embodiment, the dynamic RTA speed region graphic 402 may be depicted as a thickened portion of the flight profile 302 extending along only the upper or only the lower side of the VSD 304. The RTA speed region graphic 402 is dynamically interactive, as it was in FIG. 3. A hand symbol 404 indicates that the user has selected the Cruise speed region. In response to the user selection, the system 102 displays an alphanumeric window 408 showing the RTA speed region parameters for the Cruise speed region. In various embodiments, and with reference to Table 1, the window 408 entries include: Cruise speed region; change priority 2; modify max 100%; modify min 0%; and, delete speed region. The user may edit/select each of the entries.

In FIG. 5, a dynamic RTA speed region graphic 502 is depicted as a thickened portion of the X axis of the VSD 304 extending on both the upper and lower side of the X axis. In another embodiment, the dynamic RTA speed region graphic 402 may be depicted as a thickened portion of the X axis extending along only the upper or only the lower side of the X axis. The RTA speed region graphic 502 is dynamically interactive, as it was in FIG. 3 and FIG. 4. A hand symbol 504 indicates that the user has selected the Climb Mach Speed region. In response to the user selection, the system 102 displays an alphanumeric window 506 showing the RTA speed region parameters for the Climb Mach Speed region. In various embodiments, and with reference to Table 1, the window 506 entries include: Climb Mach Speed region; change priority 4; modify max 80%; modify min 0%; and, delete speed region. The user may edit/select each of the entries.

In addition to the examples provided, the system 102 allows the user to edit a beginning and an ending of an RTA speed region. In any of the examples, this may include sliding the start point and/or end point left or right. Also, after the user has entered one selection/modification, the user may observe the updated and modified RTA speed band graphic, and then enter another selection/modification. The system 102 may cooperate with the FMS 122 in the population of the speed ranges for the RTA speed regions after each user input.

The images 28 of the avionics displays 300, 400, and 500, of FIGS. 3-5 provide non-limiting examples of this technological enhancement over other flight guidance systems. The images of FIGS. 3-5 are understood to be based on current aircraft status data for the aircraft 100 and to be dynamically modified responsive to continuously obtaining and processing the current aircraft status data. The images 28 may also be continuously updated to reflect real-time changes with respect to terrain, airport features, weather and neighbor traffic/relevant traffic.

Figure 6:
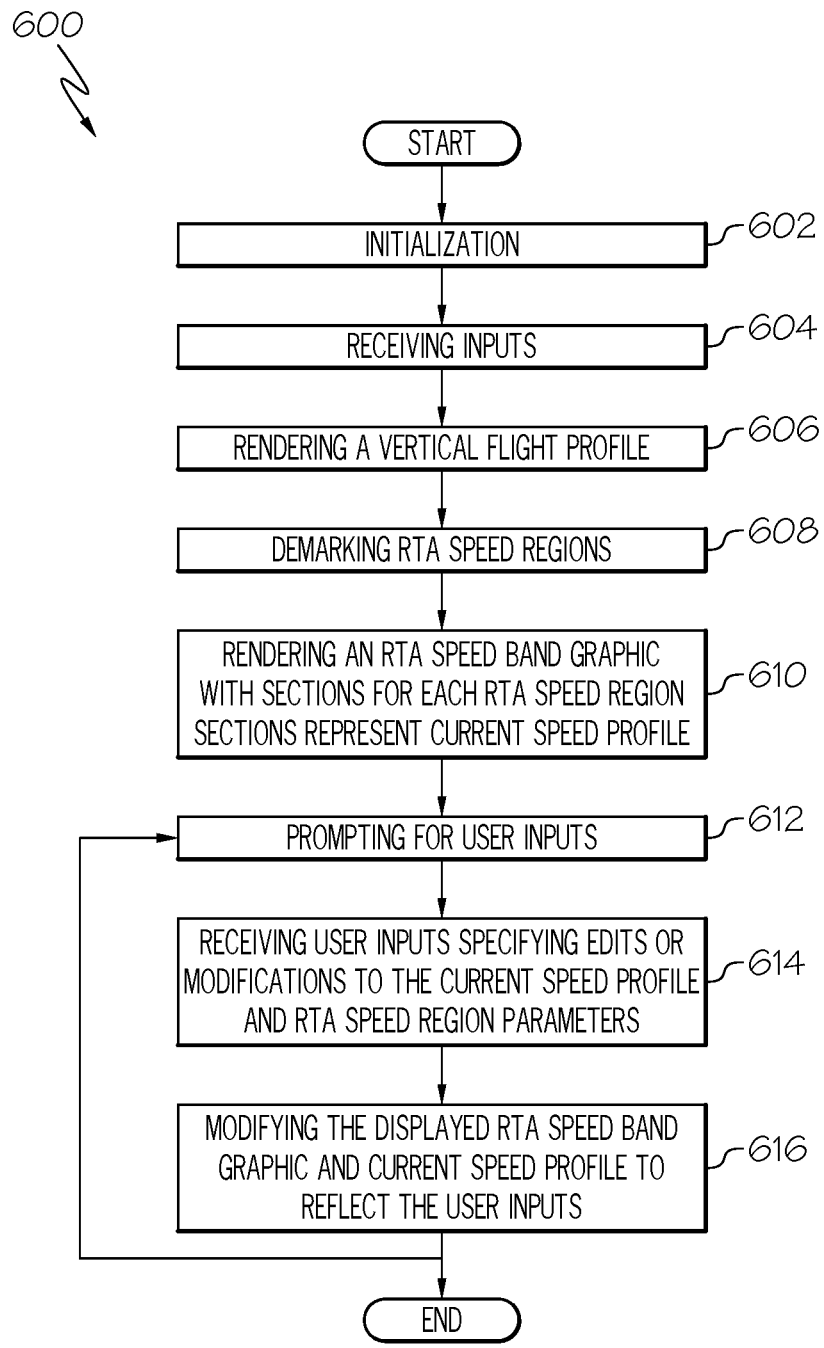
FIG. 6 is a flow chart for a method for dynamically modifiable speed limits in required time of arrival (RTA) regions of an assigned flight path, in accordance with an exemplary embodiment.

Referring now to FIG. 6 and with continued reference to FIGS. 1-5, a flow chart is provided for a method 600 for providing dynamically modifiable parameters in required time of arrival (RTA) speed regions of an assigned flight path, in accordance with various exemplary embodiments. For illustrative purposes, the following description of method 600 may refer to elements mentioned above in connection with FIG. 1. In practice, portions of method 600 may be performed by different components of the described system. It should be appreciated that method 600 may include any number of additional or alternative tasks, the tasks shown in FIG. 6 need not be performed in the illustrated order, and method 600 may be incorporated into a more comprehensive procedure or method having additional functionality not described in detail herein. Moreover, one or more of the tasks shown in FIG. 6 could be omitted from an embodiment of the method 600 if the intended overall functionality remains intact.

The method starts, and at 602 the control module 104 is initialized. As mentioned above, initialization may comprise uploading or updating instructions and applications 160, program 162, stored variables 164, and various lookup tables stored in the database 156. Stored variables may include, for example, parameters for setting up a user interface, and the various shapes, various colors and/or visually distinguishing techniques used for icons and alerts. In some embodiments, program 162 includes additional instructions and rules for rendering information differently based on type of display device in display system 112. Initialization at 602 may also include identifying external sources 50 and/or external signals and the communication protocols to use with each of them.

At 604, inputs are received into the system 102. Inputs may include a prescribed flight plan, navigation data, including location and speed, an RTA, weather data, and the like. Sources of an RTA may be air traffic control (ATC), the prescribed flight plan, pilot input, etc. During operation, it is understood that navigation data is continuously received. At 606, the system 102 may render a vertical flight profile 302 and determine a current speed profile, with an initial plurality of RTA speed regions, that is a function of the RTA. The system 102 may also generate initial RTA speed region parameters (see, for example, Table 1). At 608, the vertical flight profile 302 is demarked with a plurality of RTA speed regions; and, at 610, the RTA speed band graphic having a section that corresponds to each RTA speed region is rendered. The initial RTA speed band graphic may represent parameters from the initial speed profile.

User inputs may be prompted for at 612. As mentioned, prompting may be active or passive. At 612, the user is prompted to enter user input to edit an RTA speed region of the plurality of RTA speed regions, the user input being for each of (i) edit a priority order for the RTA speed region, (ii) edit a beginning and an ending of an RTA speed region, (iii) select an RTA speed region for a speed range modification, and specify the speed range modification to the selected RTA speed region.

At 614, the system 102 receives user input specifying one or more edits and modifications to an RTA speed region in the current speed profile, as described hereinabove. At 616, the system 102 modifies the displayed RTA speed band graphic and the current speed profile, as a function of the user input. After 616, the method 600 may return to prompting for user inputs at 612, or end. Method 600 may cycle until the aircraft 100 lands.

Thus, technologically improved systems and methods for optimizing the operation of speed brakes in an aircraft are provided. As is readily appreciated, the above examples of the system 102 for providing dynamic readouts for a cockpit display are non-limiting, and many others may be addressed by the control module 104.

Those of skill in the art will appreciate that the various illustrative logical blocks, modules, circuits, and algorithm steps described in connection with the embodiments disclosed herein may be implemented as electronic hardware, computer software, or combinations of both. Some of the embodiments and implementations are described above in terms of functional and/or logical block components (or modules) and various processing steps. However, it should be appreciated that such block components (or modules) may be realized by any number of hardware, software, and/or firmware components configured to perform the specified functions. To clearly illustrate the interchangeability of hardware and software, various illustrative components, blocks, modules, circuits, and steps have been described above generally in terms of their functionality. Whether such functionality is implemented as hardware or software depends upon the application and design constraints imposed on the overall system.

Skilled artisans may implement the described functionality in varying ways for each application, but such implementation decisions should not be interpreted as causing a departure from the scope of the present invention. For example, an embodiment of a system or a component may employ various integrated circuit components, e.g., memory elements, digital signal processing elements, logic elements, look-up tables, or the like, which may carry out a variety of functions under the control of one or more microprocessors or other control devices. In addition, those skilled in the art will appreciate that embodiments described herein are merely exemplary implementations.

Further, the various illustrative logical blocks, modules, and circuits described in connection with the embodiments disclosed herein may be implemented or performed with a general-purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but in the alternative, the processor may be any conventional processor, controller, microcontroller, or state machine. A processor may also be implemented as a combination of computing devices, e.g., a combination of a DSP and a microprocessor, a plurality of microprocessors, one or more microprocessors in conjunction with a DSP core, or any other such configuration.

The steps of the method or algorithm described in connection with the embodiments disclosed herein may be embodied directly in hardware, in a software module executed by a controller or processor, or in a combination of the two. A software module may reside in RAM memory, flash memory, ROM memory, EPROM memory, EEPROM memory, registers, hard disk, a removable disk, a CD-ROM, or any other form of storage medium known in the art. An exemplary storage medium is coupled to the processor such that the processor can read information from, and write information to, the storage medium. In the alternative, the storage medium may be integral to the processor. The processor and the storage medium may reside in an ASIC.

In this document, relational terms such as first and second, and the like may be used solely to distinguish one entity or action from another entity or action without necessarily requiring or implying any actual such relationship or order between such entities or actions. Numerical ordinals such as "first," "second," "third," etc. simply denote different singles of a plurality and do not imply any order or sequence unless specifically defined by the claim language. The sequence of the text in any of the claims does not imply that process steps must be performed in a temporal or logical order according to such sequence unless it is specifically defined by the language of the claim. When "or" is used herein, it is the logical or mathematical or, also called the "inclusive or."

Accordingly, A or B is true for the three cases: A is true, B is true, and, A and B are true. In some cases, the exclusive "or" is constructed with "and;" for example, "one from the set including A and B" is true for the two cases: A is true, and B is true.

Furthermore, depending on the context, words such as "connect" or "coupled to" used in describing a relationship between different elements do not imply that a direct physical connection must be made between these elements. For example, two elements may be connected to each other physically, electronically, logically, or in any other manner, through one or more additional elements.

While at least one exemplary embodiment has been presented in the foregoing detailed description of the invention, it should be appreciated that a vast number of variations exist. It should also be appreciated that the exemplary embodiment or exemplary embodiments are only examples, and are not intended to limit the scope, applicability, or configuration of the invention in any way. Rather, the foregoing detailed description will provide those skilled in the art with a convenient road map for implementing an exemplary embodiment of the invention. It being understood that various changes may be made in the function and arrangement of elements described in an exemplary embodiment without departing from the scope of the invention as set forth in the appended claims.

What is claimed is:

1. A processor-implemented method providing dynamically modifiable parameters in required time of arrival (RTA) speed regions of an assigned flight path, comprising:
rendering a vertical flight profile of the assigned flight path on a vertical situation display (VSD);
demarking the vertical flight profile with a plurality of RTA speed regions associated with a speed profile based on a received RTA;
rendering, on the VSD, an RTA speed band graphic that extends horizontally from a start of climb speed to a start of approach speed, the RTA speed band graphic having demarked sections that vertically represent a speed minimum and speed maximum associated with a current speed profile, the speed minimum and speed maximum referred to as a speed range, and a vertical spread for the RTA speed band graphic representing a normalized speed range between zero and a maximum value for each respective RTA speed region;
prompting a user for user input to edit an RTA speed region of the plurality of RTA speed regions, the user input being for each of (i) edit a priority order for the RTA speed region, (ii) edit a beginning and an ending of an RTA speed region, and (iii) select an RTA speed region for a speed range modification; and
in response to receiving the user input, modifying the RTA speed band graphic and the current speed profile to reflect the user input, whereby the aircraft is controlled using the modified current speed profile.

2. The method of claim 1,
wherein the user input includes decreasing a magnitude of a speed range for a selected RTA speed region; and
wherein modifying the RTA speed band graphic includes rendering a decreased magnitude speed range for the selected RTA speed region.

3. The method of claim 1,
wherein the user input includes increasing a magnitude of a speed range for a selected RTA speed region; and
wherein modifying the RTA speed band graphic includes rendering an increased magnitude speed range for the selected RTA speed region.

4. The method of claim 1, further comprising rendering the RTA speed band graphic as a thickened portion along the X axis of the VSD.

5. The method of claim 1, further comprising rendering the RTA speed band graphic as a thickened portion of the vertical flight profile.

6. The method of claim 1, further comprising rendering the RTA speed band graphic as aligned above, but separate from, the vertical flight profile.

7. The method of claim 1, wherein the user input includes disabling RTA speed control for the RTA speed region.

8. A system providing dynamically modifiable parameters in required time of arrival (RTA) speed regions of an assigned flight path, comprising:
a vertical situation display (VSD) rendering thereon rendering a vertical flight profile of the assigned flight path; and
a processor programmed to:
demark the vertical flight profile with a plurality of RTA speed regions associated with a speed profile based on a received RTA;
render, on the VSD, an RTA speed band graphic that extends horizontally from a start of climb speeds to a start of approach speeds, the RTA speed band graphic having demarked sections that vertically represent a speed minimum and speed maximum associated with a current speed profile, the speed minimum and speed maximum referred to as a speed range, and a vertical spread for the RTA speed band graphic representing a normalized speed range between zero and a maximum value for each respective RTA speed region;
prompt a user for user input to edit an RTA speed region of the plurality of RTA speed regions, the user input being for each of (i) edit a priority order for the RTA speed region, and (ii) select an RTA speed region for a speed range modification;
receive user input for an RTA speed region; and
modify the RTA speed band graphic and the current speed profile to reflect the user input, whereby the aircraft is controlled using the modified current speed profile.

9. The system of claim 8, wherein the user input includes a pilot defined start point and end point for the RTA speed region.

10. The system of claim 9, wherein the user input includes disabling RTA speed control for the RTA speed region.

11. The system of claim 10, wherein the processor is further programmed to render the RTA speed band graphic as aligned above, but separate from, the vertical flight profile.

12. The system of claim 10, wherein the processor is further programmed to render the RTA speed band graphic as a thickened portion along the X axis of the VSD.

13. The system of claim 10, wherein the processor is further programmed to render the RTA speed band graphic as a thickened portion of the vertical flight profile.

14. The system of claim 11,
wherein the user input includes decreasing a magnitude of a speed range for a selected RTA speed region; and
wherein the processor is further programmed to modify the RTA speed band graphic by rendering a decreased magnitude speed range for the selected RTA speed region.

15. The system of claim 14,
wherein the user input includes increasing a magnitude of a speed range for a selected RTA speed region; and wherein the processor is further programmed to modify the RTA speed band graphic by rendering an increased magnitude speed range for the selected RTA speed region.

16. A flight guidance system providing dynamically modifiable parameters in required time of arrival (RTA) speed regions of an assigned flight path of an aircraft, comprising:
a display system with a vertical situation display (VSD) rendering thereon a vertical flight profile of the assigned flight path; and
    a control module coupled to the display system and configured to:
demark the vertical flight profile with a plurality of RTA speed regions related to an initial speed profile that is a function of an RTA;
    render, on the display system, an RTA speed band graphic having demarked sections vertically aligned with the plurality of RTA speed regions, each demarked section vertically representing a speed minimum and speed maximum for an respective RTA speed region, the speed minimum and speed maximum referred to as a speed range, and a vertical spread for the RTA speed band graphic representing a normalized speed range between zero and a maximum value for each respective RTA speed region;
    receive user input for an RTA speed region for at least editing a priority order for the RTA speed region; and
    modify the RTA speed band graphic and the current speed profile to reflect the user input, whereby the aircraft is controlled using the modified current speed profile.

17. The flight guidance system of claim 16, wherein the controller is configured to accept user input to edit a beginning and an ending of an RTA speed region.

18. The flight guidance system of claim 17, wherein the controller is configured to accept user input to select an RTA speed region for a speed range modification.

19. The flight guidance system of claim 18, wherein the controller is further configured to accept user input for disabling RTA speed control for the RTA speed region.

\* \* \* \* \*